July 8, 1952
W. H. GIVENROD
2,602,669
FERTILIZER DISTRIBUTOR
Filed July 19, 1949
2 SHEETS—SHEET 1
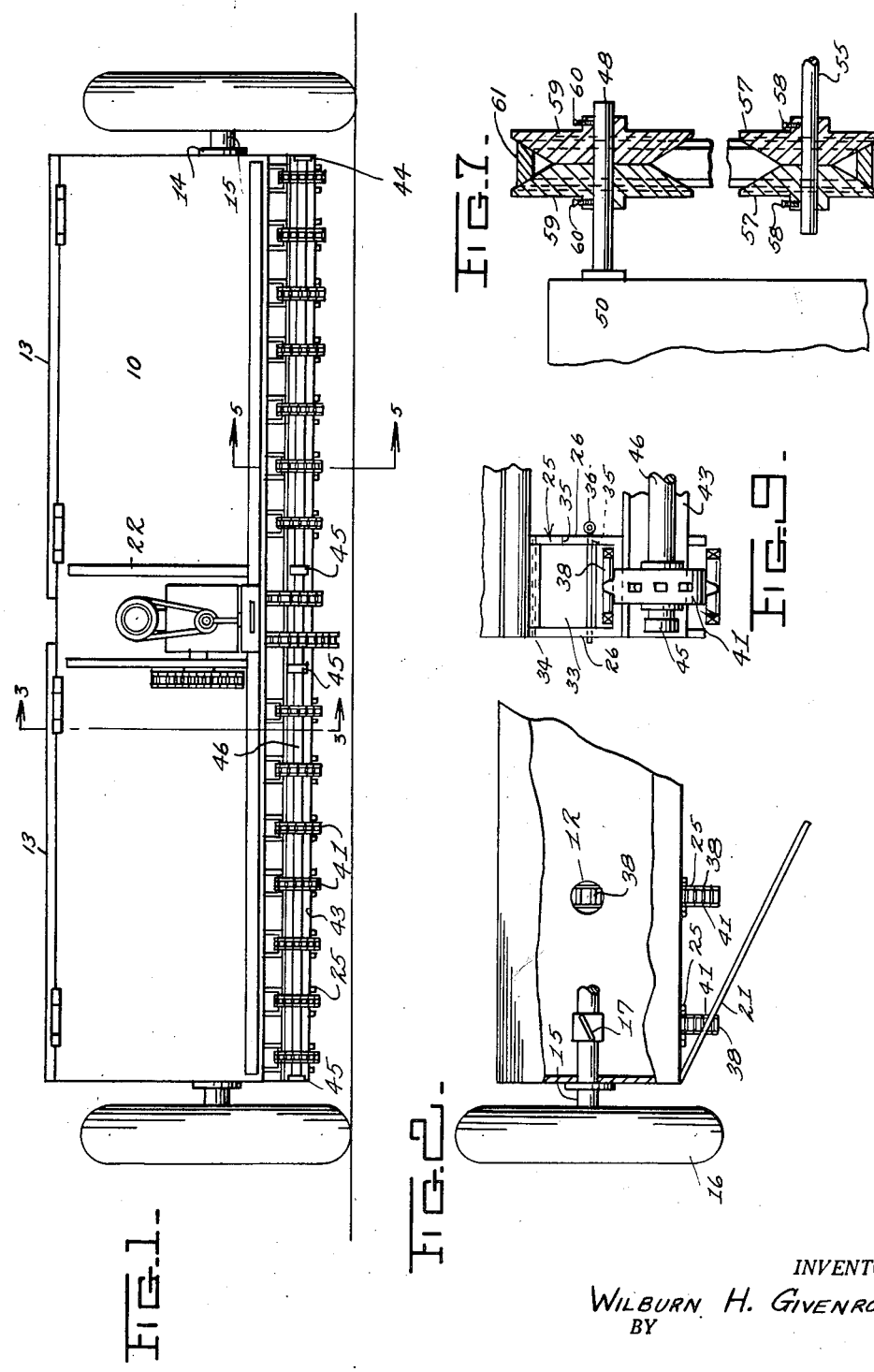
INVENTOR.
WILBURN H. GIVENROD
BY
McMorrow, Berman & Davidson
ATTORNEYS July 8, 1952 W. H. GIVENROD 2,602,669
FERTILIZER DISTRIBUTOR
Filed July 19, 1949 2 SHEETS—SHEET 2
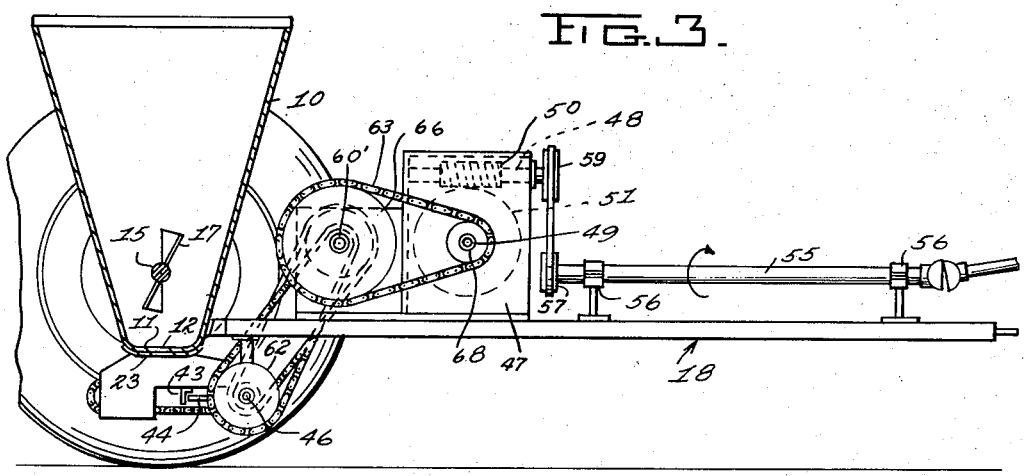
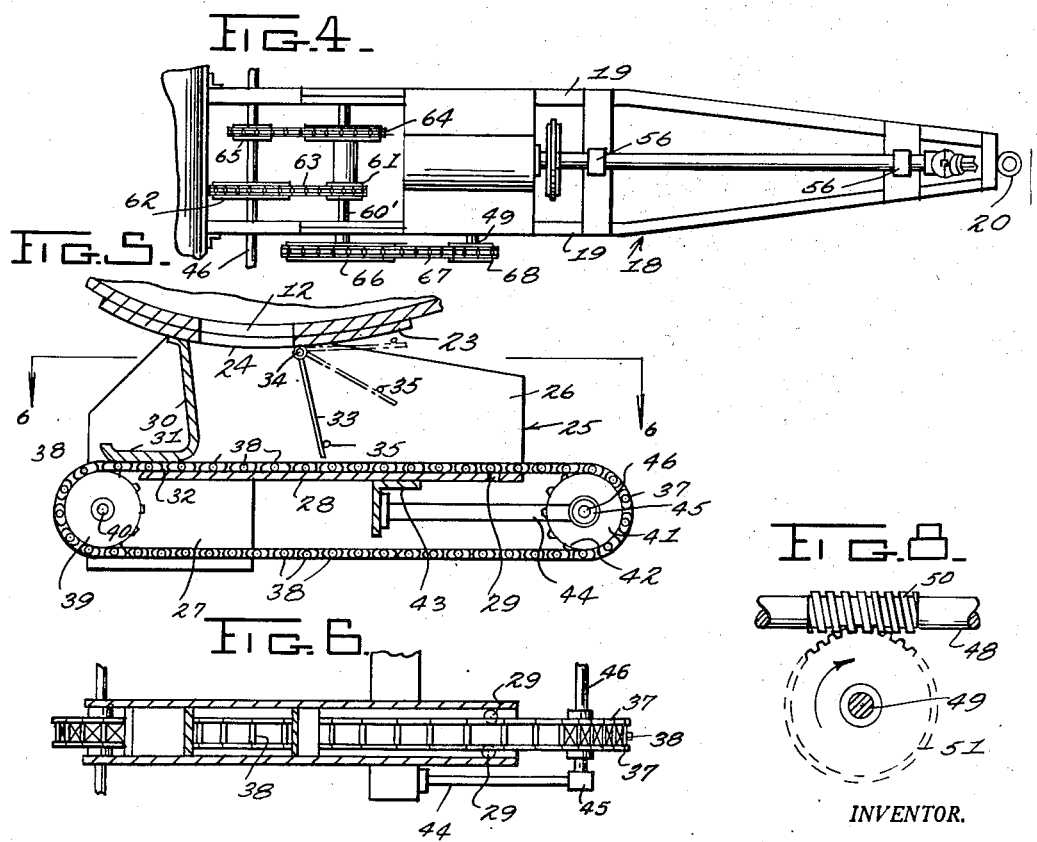
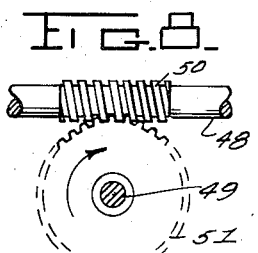
INVENTOR.
WILBURN H. GIVENROD
BY
McMorrow, Berman & Davidson
ATTORNEYS Patented July 8, 1952

2,602,669

UNITED STATES PATENT OFFICE 2,602,669

FERTILIZER DISTRIBUTOR

Wilburn H. Givenrod, Belleville, Ill., assignor to Avco Manufacturing Corporation, Cincinnati, Ohio, a corporation of Delaware Application July 19, 1949, Serial No. 105,561

2 Claims. (Cl. 275—2)

My invention relates to fertilizer distributors.

An important object of the invention is to provide a fertilizer distributor which may have a very low rate of fertilizer discharge without clogging, and which is readily adjustable within wide limits to vary the rate of discharge.

A further object is to provide a machine for accurately distributing any kind of fertilizer material, whether the material be dry, wet, trashy or lumpy.

A further object of the invention is to provide means to prevent the improper discharge of the fertilizer from the distributing shoe.

A further object of the invention is to provide a distributing unit which may be built into the machine or applied to a machine as an attachment.

In the accompanying drawings, forming a part of this application, and in which like numerals are employed to designate like parts throughout the same, Figure 1 is a front elevation of a machine embodying my invention, Figure 2 is a plan view of the same, parts broken away, Figure 3 is a vertical section taken on line 3—3 of Figure 1, Figure 4 is a plan view of the tongue and associated elements, parts broken away, Figure 5 is a vertical section through one of the feed shoes, taken on line 5—5 of Figure 1, Figure 6 is a horizontal section taken on line 6—6 of Figure 5, Figure 7 is a transverse central vertical section taken through the cone faced pulleys of the variable speed gearing, Figure 8 is a side elevation of gearing within the gear box, Figure 9 is an enlarged front end elevation of one of the distributing shoes.

In the drawings, the numeral 10 designates a long hopper for holding the finely divided fertilizer material or the like to be distributed. This hopper tapers downwardly and has a bottom 11 provided with spaced openings 12. The hopper may be equipped at its top with hinged covers 13. At its ends the hopper has bearings 14 secured thereto rotatably receiving an axle 15, carried and driven by wheels 16 equipped with rubber tires. The shaft or axle 15 is arranged near but spaced above the bottom 11 and is equipped with agitators 17. A tongue 18 is provided, including spaced bars 19, the forward ends of which converge and are provided at their forward ends with a hitch element 20 for attachment to the rear end of a tractor. This tongue is disposed forwardly of the hopper 10, at its longitudinal center, and is rigidly connected therewith by any suitable means. The numeral 21 designates horizontal diagonal braces connecting the tongue and the hopper and 22 designates upstanding diagonal braces connecting the tongue and hopper.

The distributing unit comprises a plate 23, arranged beneath the bottom 11 of the hopper and extending throughout its entire length. This plate has openings 24 in registration with the openings 12. The numeral 25 designates a plurality of feed shoes, corresponding in number and arrangement to the openings 24, and one opening 24 discharges into each feed shoe. Each feed shoe comprises a pair of spaced vertical sides 26, having rear depending extensions 27 and a horizontal bottom 28. The bottom is provided near its forward discharge end with openings 29. Arranged between each pair of sides 26 is an upstanding end or wall 30 rigidly secured to the sides and closing the rear end of the feed shoe. The end 30 is provided at its lower end with a horizontal extension 31, spaced a short distance from the rear end of the bottom 28 for forming a reduced passage 32. The sides 26 of the several shoes are welded or otherwise rigidly secured to the plate 23, and the plate 23 is welded or otherwise rigidly secured to the bottom 11. The forward end of each horizontal distributing shoe is open and an angularly adjustable control plate or valve 33 is mounted between the sides 26 and is pivotally connected at its top with the sides by a pin 34. The lower end of the control plate or valve, in the lowermost position, is at the elevation of the horizontal extension 31. The sides 26 are provided with vertically spaced aligned pairs of openings 35, for receiving a long cotter pin 36, arranged in advance of the control plate or valve, to limit its forward and outward movement. This cotter pin 36 may be inserted in either pair of openings 35, or it may not be used at all.

An endless distributor element is provided for each feed shoe, including a pair of flexible endless elements or sprocket chains 37, connected by sweep rods 38. These sweep elements are spaced so that the fertilizer will not adhere to the same. The endless distributor element includes upper and lower horizontal runs, and the upper run operates above the bottom 28 and extends forwardly and rearwardly beyond the ends of the feed shoe. The rear end of the endless distributor passes about a pulley 39, carried by a shaft 40, secured to the depending extensions 27. The forward end of the endless distributor element passes about a pulley 41, having teeth 42, which engage between the sweep rods 38 to advance the endless distributor element. Arranged beneath the bottoms 28 of the distributor shoes and rigidly secured thereto by welding or the like is a horizontal angle iron 43, extending for the entire length of the plate 23. This angle iron has horizontal arms 44 rigidly secured thereto, projecting forwardly beyond the feed shoes and equipped with bearings 45 for rotatably holding a horizontal transverse shaft 46, which is common to all pulleys 41, which are rigidly mounted thereon. Two of the arms 44 are arranged at the ends of the shaft 46, while two of them are disposed near the longitudinal center of this shaft.

The drive means for the shaft 46 includes a gear casing 47 rigidly mounted upon the tongue 18. An upper longitudinal shaft 48 is carried by the gear casing 47, which also carries a lower transverse horizontal shaft 49, extending at right angles to the shaft 48. The shaft 48 has a helical worm 50 rigidly mounted thereon, and engaging a large worm gear 51, mounted upon the shaft 49. The shaft 49 is driven clockwise, Figure 3, and its speed of rotation is greatly reduced by the worm gear drive. The numeral 55 designates a longitudinal drive shaft which is mounted within bearings 56, secured to the tongue 18. This drive shaft is connected with a power take-off of the tractor. Variable speed gearing is arranged between the shaft 55 and shaft 48. This variable speed gearing includes a pair of cone faced pulleys 57, which are adjustably and removably mounted upon the shaft 55 and clamped thereto by bolts 58. This gearing further comprises a pair of cone faced pulleys 59, of larger diameter than the pulleys 57, and adjustably and removably mounted upon the shaft 48 and clamped thereto by bolts 60. A tapered belt 61 engages the pairs of cone faced pulleys. It is thus seen that by axially adjusting the cone faced pulleys in each pair, their effective diameter may be changed, thus altering the speed ratio. Further, the pairs of cone faced pulleys may be removed from their shafts and interchanged, that is, the pulleys 59 may be applied to the shaft 55, and the pulleys 57 to the shaft 48. As more clearly shown in Figure 4, a transverse countershaft 60' is provided, mounted in suitable bearings on the tongue 18. A small sprocket wheel 61 is rigidly mounted upon the shaft 60' in alignment with a large sprocket wheel 62 rigidly mounted upon the shaft 46. The sprocket wheels 61 and 62 are connected by a sprocket chain 63. A large sprocket wheel 64 is rigidly mounted upon the shaft 60', in alignment with a small sprocket wheel 65 rigidly mounted upon the shaft 46. To change the gear ratio, the sprocket chain 63 is removed from sprocket wheels 61 and 62 and applied to sprocket wheels 64 and 65. A large sprocket wheel 66 is rigidly mounted upon the end of the countershaft 60' and is engaged by a sprocket chain 67, engaging a small sprocket wheel 68, rigidly mounted upon the shaft 49.

The operation of the machine is as follows:

The finely divided fertilizer material is held within the hopper 10 and will drop freely through the openings 12 and 24 due to the action of the agitators 17. The distributor is moved bodily forwardly by the tractor, and the longitudinal shaft 55 is driven by the power take-off of the tractor and turns in the direction of its arrow. Rotation of the shaft 55 is transmitted to the shaft 49, rotating clockwise. By adjustment of the variable speed gearing, including the cone faced pulleys 57 and 59, the shaft 48 will turn in the same direction with the shaft 55, at a lower speed or at the same speed, and by interchanging the pairs of cone faced discs the shaft 48 may be driven at a higher speed than the shaft 55. When the sprocket chain 63 engages sprocket wheels 61 and 62, the rotation of the shaft 46 is reduced, but by shifting the sprocket chain 63 to the sprocket wheels 64 and 65 the rotation of the shaft 46 is increased. The shaft 46 turns clockwise, Figure 6, and the upper run of the endless distributor element travels to the right toward the forward open end of the feed shoe. When the control plate or valve 33 is in the lowermost position, a contracted discharge passage is provided, to produce the feed of the fertilizer, but the feed is increased by placing the pin 36 in the next higher opening 35 or entirely removing the pin. The forwardly traveling fertilizer will then swing the control plate or valve to the further open position. The sprocket chains and sweep rods move the fertilizer material forwardly, and some of this fertilizer material discharges through the openings 29 and the remainder from the forward open end of the feed chute.

It is to be understood that the form of my invention herewith shown and described is to be taken as a preferred example of the same and that various changes in the shape, size and arrangement of parts may be resorted to without departing from the spirit of the invention or the scope of the subjoined claims.

Having thus described my invention, I claim:

1. A fertilizer distributor, comprising a hopper having a bottom provided with discharge openings, wheels to support the hopper, feed shoes arranged beneath the hopper and corresponding in number and arrangement to the openings, one opening discharging into each feed shoe, each feed shoe including upstanding sides, a substantially horizontal bottom formed to define a plurality of discharge openings behind the forward edge and an upstanding end provided with a substantially horizontal extension forming a restricted passage with the bottom, a transverse bar secured to the bottoms of the feed shoes, a transverse shaft disposed in advance of the feed shoes, supporting elements mounted upon the transverse bar and carrying the transverse shaft, a conveyor type endless distributor element for each feed shoe including an upper run arranged above the bottom of the feed shoe and passing through the contracted passage, the endless distributor element including spaced sweep bars, a rear rotatable element mounted upon each shoe and engaged by the corresponding endless distributor element, a rotatable element mounted upon the transverse shaft and engaging each endless distributor element and having teeth to pass between the sweep bars.

2. In a fertilizer distributor of the type supported by ground engaging means the combination comprising a hopper having a bottom provided with a plurality of transversely aligned discharge openings; feed shoes arranged beneath the hopper bottom and corresponding in number and arrangement to the hopper discharge opening; one opening discharging into each feed shoe; each feed shoe being defined by upstanding sides, a substantially horizontal bottom and an upstanding end; a feed shoe conveyor type endless distributor for conveying hopper discharge including a lower run arranged beneath the bottom of each feed shoe and an upper run arranged above the bottom of the feed shoe and below the upstanding end; the endless distributor including spaced sweep bars; a driven rotatable element mounted adjacent and below the open end of each feed shoe having teeth engaging said endless distributor for supporting and advancing the same, a rear rotatable element mounted below the bottom of said shoe and at least partially to the rearward of said upstanding end supporting the endless distributor and guiding it from the lower run into the upper run; and an adjustable control plate positioned between each of said upstanding shoe sides for controlling the depth of material carried by said endless distributor between the shoe sides.

WILBURN H. GIVENROD.

REFERENCES CITED

The following references are of record in the file of this patent:

UNITED STATES PATENTS

| Number | Name | Date |
|---|---|---|
| 1,423,649 | Daniel | July 25, 1922 |
| 1,637,601 | Bussey | Aug. 2, 1927 |
| 1,894,008 | Segars | Jan. 10, 1933 |
| 2,400,646 | Klein | May 21, 1946 |
| 2,541,867 | Givenrod | Feb. 13, 1951 |